(12) United States Patent
Sarosi et al.

(10) Patent No.: US 7,623,933 B2
(45) Date of Patent: Nov. 24, 2009

(54) METHODS AND APPARATUS FOR CONTROLLING DISPLAY IN A NETWORKED DEVICE

(75) Inventors: George W. Sarosi, Charlotte, NC (US); Patrick Ladd, San Marcos, CA (US)

(73) Assignee: Time Warner Cable Inc., New York, NY (US)

( * ) Notice: Subject to any disclaimer, the term of this patent is extended or adjusted under 35 U.S.C. 154(b) by 523 days.

(21) Appl. No.: 11/150,654

(22) Filed: Jun. 10, 2005

(65) Prior Publication Data
US 2006/0291507 A1     Dec. 28, 2006

(51) Int. Cl.
*G06F 19/00* (2006.01)
(52) U.S. Cl. .......................................... 700/83; 340/439
(58) Field of Classification Search .................. 700/83; 714/43; 340/400, 439; 209/221; 715/781, 715/804
See application file for complete search history.

(56) References Cited
U.S. PATENT DOCUMENTS

| | | | |
|---|---|---|---|
| 4,845,644 A | 7/1989 | Anthias et al. | |
| 5,175,813 A | 12/1992 | Golding et al. | |
| 5,502,839 A | 3/1996 | Kolnick | |
| 5,692,142 A | 11/1997 | Craycroft et al. | |
| 5,831,609 A | 11/1998 | London et al. | |
| 5,877,755 A * | 3/1999 | Hellhake | 725/114 |
| 5,973,702 A | 10/1999 | Orton et al. | |
| 6,160,872 A * | 12/2000 | Karnowski et al. | 379/93.09 |
| 6,456,892 B1 | 9/2002 | Dara-Abrams et al. | |

(Continued)

OTHER PUBLICATIONS

Hentschel et al., Video Quality of Service for Consumer Terminal a Novel System for Programmable Comonets, 2002, IEEE, pp. 28-29.*

(Continued)

*Primary Examiner*—Kidest Bahta
(74) *Attorney, Agent, or Firm*—Gazdzinski & Associates, PC

(57) ABSTRACT

Methods and apparatus for controlling display elements within a networked device. In one embodiment, the network comprises a cable television network, and the device a digital set-top box (DSTB) with front panel display(s). A downloadable software module is provided that is adapted to discover the front panel display capabilities of the device, and control the display accordingly. This approach allows, inter alia, the cable network operator or other entity to manage the user's experience relating to the front panel display(s) on various types of client devices. The module is also optionally platform-agnostic (i.e., "universal") so that the aforementioned capabilities are provided largely irrespective of the device hardware/software environment.

22 Claims, 7 Drawing Sheets

U.S. PATENT DOCUMENTS

| | | |
|---|---|---|
| 6,895,573 B2 * | 5/2005 | Nørgaard et al. ............ 717/100 |
| 6,952,836 B1 | 10/2005 | Donlan |
| 6,973,050 B2 | 12/2005 | Birdwell |
| 7,096,459 B2 | 8/2006 | Keller |
| 7,111,072 B1 * | 9/2006 | Matthews et al. ........... 709/238 |
| 7,194,249 B2 | 3/2007 | Phillips |
| 7,266,726 B1 | 9/2007 | Ladd |
| 2003/0217365 A1 | 11/2003 | Caputo |
| 2004/0218736 A1 * | 11/2004 | Fang et al. ............... 379/88.13 |
| 2005/0015799 A1 | 1/2005 | Park |
| 2005/0114900 A1 | 5/2005 | Ladd |
| 2006/0130107 A1 | 6/2006 | Gonder |

OTHER PUBLICATIONS

Chou et al., Open CPE Architecture : A solution to the Delivery of Integrated Services over Broadband, Intel Communication Group, Corp. pp. 1-10.*

Eldering, Charles, Customer Premises Epuipment Residential Broadband Networks, Jun. 1997, IEEE, p. 114-212.*

Kar et al., Cable's Home Digital Network Interface Of Choice, 1999, Cable Television Lab. IEEE, pp. 34-35.*

* cited by examiner

METHODS AND APPARATUS FOR CONTROLLING DISPLAY IN A NETWORKED DEVICE

RELATED APPLICATIONS

This application is related to co-pending and co-owned U.S. application Ser. Nos. 10/723,959 filed Nov. 24, 2003 entitled "METHODS AND APPARATUS FOR HARDWARE REGISTRATION IN A NETWORK DEVICE" and No. 10/773,664 filed Feb. 6, 2004 entitled "METHODS AND APPARATUS FOR DISPLAY ELEMENT MANAGEMENT IN AN INFORMATION NETWORK", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the fields of managed networks and client devices. In one exemplary aspect, the invention relates to a method of allowing operator control of the display elements of consumer premises equipment (CPE) in a cable television network.

2. Description of Related Technology

The front panel display of CPE such as cable or satellite set-top boxes (STBs) is typically designed to perform the function of providing visual feedback to a user regarding, e.g., the operational state of the device. This feedback could for example include the channel number to which the user is currently tuned, a text string description of the channel, the genre of the channel, and so on. Similarly, the front panel display is used as a display device during CPE setup and diagnostics.

Feedback provided by the front panel display subsystem of a CPE thus constitutes a part of the total user experience offered by a network operator. Hence, network operators have a desire to maintain at least some degree of control over the design, functionality and operation of the front panel display. In conventional television distribution networks where only client devices authorized by the network operator (whether leased or purchased) are allowed to receive programming, maintaining such a control of the display subsystem is effectively achieved through the product specification, testing and approval process.

The recent OpenCable™ initiative managed by CableLabs includes a goal of helping the cable industry deploy interactive services over cable. OpenCable has introduced a set of industry standards, which will help accomplish this goal via three key objectives including defining the next-generation digital consumer device, encouraging supplier competition, and creating a viable retail hardware platform.

The OpenCable project has two key components: a hardware specification and a software specification. The hardware specification allows a receiver, e.g., that can be sold via retail channels, to provide interoperability within various different network environments. The software specification of the OpenCable project, called the OpenCable Applications Platform (OCAP), addresses the issue of proprietary operating system software by creating a common platform upon which interactive services may be deployed.

The OpenCable Applications Platform specification is a middleware software layer specification. OCAP is intended to enable the developers of interactive television services and applications to design such products so that they will run successfully on any cable television system in North America, independent of set-top or television receiver hardware or operating system software choices. A similar project had been undertaken by the Digital Video Broadcasting (DVB) consortium and has produced a specification called Multimedia Home Platform (MHP).

Availability of specifications such as OCAP and MHP enable manufacturers and retail distributors of set-tops, television receivers or other devices to build and to sell attractive and highly capable devices to consumers that support all services delivered by cable operators to devices currently available to consumers (i.e., via lease from the cable operators).

As previously noted, the front panel display of such set-top devices is typically designed to perform the function of providing visual feedback to the viewers regarding the operational state of the device. However, standardized middleware such as MHP and OCAP do not provide a way for the network operator to discover and control front panel functionality of such consumer devices. One problem has been the varied and highly heterogeneous nature of features and functions used to build front panel display elements by various manufacturers. For example, the capabilities of displays based on Light Emitting Diode (LED) technology are often very different from those of displays built using Liquid Crystal Display (LCD).

In many LCD implementations, the front panel display is capable of multiple lines of colored text, or even the display of graphical images or animations. In such cases, the front panel display is generally used as a secondary display to the primary television (or other monitor) screen.

Segmented LED displays, which are typical in many types of CPE, have separate LEDs for representing a colon (:) used for time display, and a period (.), and can be used for floating point number or two part channel numbers. These are special characters not part of any segmented LED. LCDs may not have these characters. LEDs are also used in CPE to indicate to a user the status of operational parameters or functions such as power, radio frequency (RF) bypass, availability of an electronic message, and the activation of a recording mode or similar function.

A variety of approaches to characterizing and/or controlling display elements in a CPE or other device are disclosed in the prior art. For example, U.S. Pat. No. 4,845,644 to Anthias, et al. issued Jul. 4, 1989 and entitled "Data display system" discloses a data display system in which input-output display devices are connected to a central processor, and users select application programs that are run on the central processor. The control system of the central processor includes a display manager control system and a windowing control mechanism which allows a plurality of tasks to be performed concurrently and the results displayed in areas of a display screen. The display manager includes, means to combine data from each application and build a display representation that shows many windows into the various applications onto a single screen, and means to call the coordination controller identified by the task management application so that the task manager can suspend applications that are waiting for input and resume those applications which have input available.

U.S. Pat. No. 5,175,813 to Golding, et al. issued Dec. 29, 1992 and entitled "Window display system and method for creating multiple scrollable and non-scrollable display regions on a non-programmable computer terminal" discloses a windowing system with interface between application programs and non-programmable terminal drivers. The system presents logical windows to the applications program, each of which are represented internally by at least two separate parts. The first part includes the border and non-scrollable text for a logical window, while the second part includes scrollable text for the window. Through calls to the display driver, the windowing system manipulates these separate parts so that they are displayed on the screen as a single window.

U.S. Pat. No. 5,502,839 to Kolnick issued Mar. 26, 1996 and entitled "Object-oriented software architecture supporting input/output device independence" discloses an object-oriented software architecture that interacts with "real" input/output devices exclusively through "virtual" input/output devices. Since all human interface with the operating system is performed through such virtual devices, the system can accept different forms of real input or output devices. The lowest level of the operating system converts input from a physical device to virtual form and converts virtual output into suitable physical output. A number of physical devices can be connected to, removed from, or replaced in the system without disrupting the system.

U.S. Pat. No. 5,692,142 to Craycroft, et al. issued Nov. 25, 1997 and entitled "Support for custom user-interaction elements in a graphical, event driven computer system" discloses a system whereby support for so-called "custom gadgets" is provided, at a system software level, in a manner that is essentially application-transparent. Specific support is provided for the addition of one custom gadget per window. The custom gadget is identified by a specific numeric code in the same manner as the close and zoom boxes. An application tells the system software what the custom gadget for a particular window should look like. The code responsible for drawing that window's frame then knows where to find the image of the custom gadget and will render it appropriately. When a user clicks in the custom gadget, the system software notifies the application of the event by means of the numeric code associated with the custom gadget.

U.S. Pat. No. 5,831,609 to London, et al. issued Nov. 3, 1998 and entitled "Method and system for dynamic translation between different graphical user interface systems" discloses a translation software that provides remote access to an application program that is executing on a host machine in its native operating system environment. The translation software monitors messages that are relayed from the application program to an application interface that is provided via the native operating system. Upon recognizing a message that affects a graphical user interface of the native operating system, the translation software converts the message into a protocol that is recognized by a remote graphical user interface. By monitoring and converting messages in this fashion, the translation software allows the application program to be displayed remotely.

U.S. Pat. No. 5,973,702 to Orton, et al. issued Oct. 26, 1999 and entitled "Oriented view system having a common window manager for defining application window areas in a screen buffer and application specific view objects for writing into the screen buffer" discloses an object-oriented view system that controls the display of screen graphics for a plurality of application programs, each of which generates graphical information for display in a window assigned to it. The view system has a system window manager which is common to all of the application programs and which defines application window areas on the display screen and corresponding application window storage areas in the display screen buffer. Each application program instantiates a view system object from class information in the computer operating system. Each view system object includes a view object with program code that directly stores screen display information generated by the application into the screen buffer. This arrangement allows the application programs to ostensibly avoid the conventional "bottleneck" that develops when all of the screen display information must be stored in the screen buffer by the common system window manager.

U.S. Pat. No. 6,456,892 to Dara-Abrams, et al. issued Sep. 24, 2002 entitled "Data driven interaction for networked control of a DDI target device over a home entertainment network" discloses a method and system for providing a user interface for a networked target device within a home audio/visual network. The DDI allows any DDI target to describe its physical appearance including controls and displays, etc., to a DDI controller. The controller can be a remote physical device or can be a software program resident on the same or separate device as the target. The controller interfaces with the target to obtain the DDI data and generates a user interface for the target including: 1) interactive controls; and 2) user display information pertinent to the target. The DDI allows the controller to trigger actions on the target as if a user had physically manipulated the controls of the target. The controller and the target are connected to the same communication network. A particular embodiment operates within the HAVi architecture. The controller communicates with the user by using the input and output devices of (typically) the device upon which the controller is executing. This communication can be done in a controller-implementation-dependent manner. The target can be a DCM that controls its device in a implementation-dependent manner. The controller may be written in a generic manner that does not need to be implemented with knowledge of a particular target in mind; all target-dependencies are represented in the DDI data provided by the target to the controller.

United States Patent Publication No. 20050015799 to Park published Jan. 20, 2005 entitled "Apparatus and method for displaying out-of-band channel information in open cable system" discloses an apparatus and a method for displaying out-of-band information without turning on a TV or set-top box in an open cable system. A receiving unit receives an out-of-band signal transmitted from a headend and parses the signal. A storage unit stores the parsed data and a user's display setting. A processing unit loads the user's display setting from the storage unit and processes the data according to the user's display setting. A control unit further processes the processed data and causes the further processed data to be displayed on an auxiliary display or main display, wherein the auxiliary display displays the further processed data in a stand-by mode state.

Despite the foregoing variety of techniques, the prior art does not disclose an adequate mechanism for discovering and controlling the various indigenous display elements of a device such as a set-top box (STB) or satellite receiver. Accordingly, what is needed is a method and apparatus that allows network operators (or others) to discover and control front panel display attributes while enabling broad retail availability and use of the device. Such a method should preferably be implemented with minimal changes to the current specification frameworks such as OCAP and MHP, and would be agnostic or "universal" across the various heterogeneous display system environments and networks in which it would be used.

SUMMARY OF THE INVENTION

The present invention addresses the foregoing needs by providing methods and apparatus for enabling discovery and control of front panel system of consumer electronics devices within content-based networks such as cable and satellite television networks.

In a first aspect of the invention, consumer premises equipment (CPE) adapted for connection to a content-based network is disclosed. In one embodiment, the CPE has a display element manager adapted to discover the presence of at least one display element of the CPE using an interface, and provide for control of the display element by a privileged application running on the CPE. In one variant, the display element comprises at least one diode- or liquid crystal-based device operative to display status or other information relating to the operation of the CPE. The interface comprises an application programming interface (API) resident on the CPE and adapted to provide privileged access to and control over the display element(s). A trusted application such as an OCAP-compliant monitor running on the CPE and having permission to utilize the API discovers and controls the display element via the API. The API is optionally adapted to interface with a plurality of different configurations of display elements, thereby allowing it to be substantially platform independent or agnostic.

In a second aspect of the invention, a method of operating consumer premises equipment (CPE) in a content-based network is disclosed. In one embodiment, the CPE comprises at least one display element, and the method comprises: providing a software interface adapted to communicate with the display element; providing a software application adapted to communicate with the display element via the interface, and control at least a portion of the operation thereof, and operating the CPE and the display element using at least the software application. The software interface is optionally independent of the particular configuration of the display element(s) on the CPE of which it is used, thereby allowing the method to be practiced across multiple heterogeneous CPE hardware environments. The API may be downloaded to the CPE after installation, or alternatively included within the CPE's software architecture during manufacture or setup. A distributed application (DA) may also be employed, wherein the aforementioned access and control of the display element(s) by the application can be effectuated remotely.

In a third aspect of the invention, a method of operating a content network having a plurality of client devices is disclosed. In one embodiment, the plurality of client devices have heterogeneous display elements (e.g., LEDs and LCDs either alone or in combination with one another on each type of device), and the method comprises: placing the plurality of the devices in communication with the network; configuring each of the devices to comprise an interface, the interface being adapted to discover and access each of the heterogeneous display elements; and operating an application on respective ones of the devices, the application controlling respective ones of the display elements thereof via the interface. The interface comprises a Java-based API in one variant; this interface can advantageously be distributed across all different types of client devices (e.g., set-top boxes) in an MSO's network without having to configure the API specifically to each platform (or type of platform).

In a fourth aspect of the invention, a method of controlling one or more display elements of an electronic device is disclosed. In one embodiment, the device is operatively coupled to a remote node (e.g., the head-end or local hub of a cable network) via a network, and adapted to run at least one application program. The method comprises: providing an application programming interface (API) on the device; running an application program on the device; discovering, via the API, the one or more display elements; and operating the one or more display elements based at least in part on inputs from the application. The application program comprises, e.g., a trusted application such as an OCAP-compliant monitor application, and the remote node comprises a software process (e.g., server portion of a distributed application) in data communication with the trusted application on the client device via one or more communication channels such as in-band or OOB messages or signaling.

In a fifth aspect of the invention, a computer-readable storage apparatus is disclosed. In one embodiment, the apparatus comprises a storage medium (e.g., hard disk drive, CD-ROM, etc.) adapted to store a computer program, the computer program comprising a Java-based programming interface adapted to communicate with at least one display element of a parent device (e.g., cable set-top box) on which the program is run. The programming interface also communicates with at least one software application running on the parent device, and allows control of the display element(s) by the application. The programming interface is optionally independent of the particular configuration of the display element and the parent device, thereby allowing it to be used across multiple types of devices.

In a sixth aspect of the invention, a software architecture useful in a consumer device of a content distribution network is disclosed. In one embodiment, the architecture comprises: a manager entity adapted to discover at least one display element of the computerized device; an indicator display interface adapted to discover at least one indicator of the at least one display element; an indicator properties interface adapted to discover at least one property of the at least one indicator; a text display component adapted to control the display of text on the at least one display element; a blink component adapted to set a blink specification of at least a portion of the at least one display; and a scroll component adapted to set a scroll specification of at least a portion of the at least one display.

DETAILED DESCRIPTION OF THE INVENTION

Figure 1:
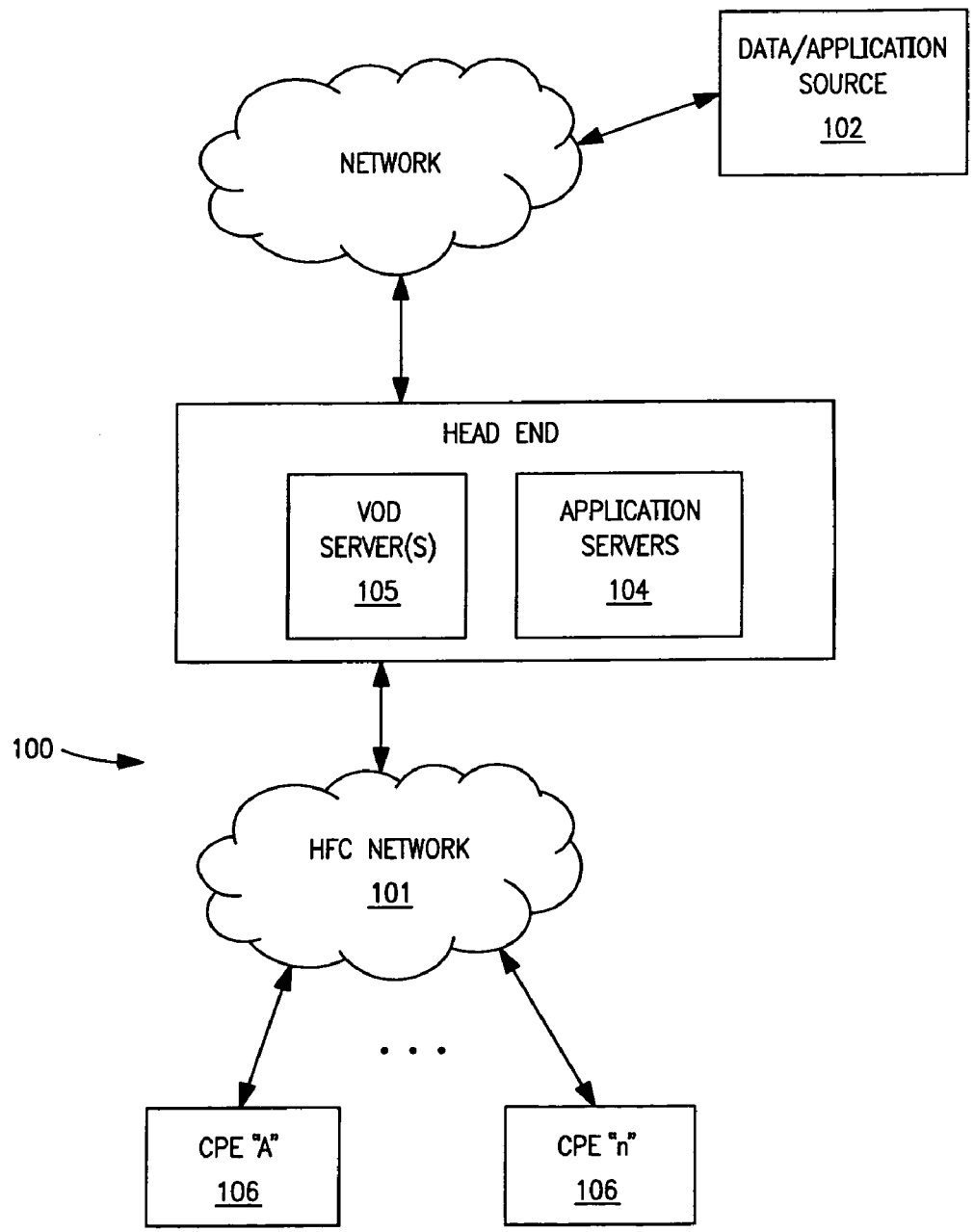
FIG. 1 is a functional block diagram illustrating an exemplary HFC network configuration useful with the present invention.

Reference is now made to the drawings wherein like numerals refer to like parts throughout.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO or multiple systems operator) that distributes programming to MSO clientele via client devices.

Such programming may include literally any information source/receiver including, inter alia, free-to-air TV channels, pay TV channels, interactive TV, and the Internet. DSTBs may literally take on any configuration, and can be retail devices meaning that customers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX/6XXX and Scientific Atlanta Explorer 2XXX/3XXX/4XXX/8XXX series digital devices, personal digital assistants (PDAs) such as the Apple Newton®, "Palm®" family of devices, handheld computers, personal communicators such as the Motorola MPx 220 devices, J2ME equipped devices, cellular telephones, or literally any other device capable of interchanging data with a network.

Similarly, the terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes, televisions, Digital Video Recorders (DVR), gateway storage devices (Furnace), and ITV Personal Computers.

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

As used herein, the terms "computer program", "routine," and "subroutine" are substantially synonymous, with "computer program" being used typically (but not exclusively) to describe collections or groups of the latter two elements. Such programs and routines/subroutines may be rendered in any language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

As used herein, the terms "display" and "front panel display" refer generally to a display or user interface on a device (e.g., CPE) that provides audio, visual, and/or other feedback or information to a user, and/or which may receive inputs from the user (such as via an LCD touch screen). Such feedback or information may relate, without limitation, to the operational state of the device, and/or response to user commands. Such display could be located anywhere on the device (e.g., front, back, top, bottom, sides), and may even be distributed across two or more devices.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "DOCSIS" refers to any of the existing or planned variants of the Data Over Cable Services Interface Specification, including for example DOCSIS versions 1.0, 1.1 and 2.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

Overview

In one exemplary aspect, the present invention provides methods and apparatus to discover the capabilities of, and control one or more features of, display systems including "front panel" displays associated with consumer premises equipment (CPE) such as set-top boxes (STBs). These front panel displays are typically in the form of multi-segment light emitting diode (LED) or liquid crystal display (LCD) element, and are used for displaying information such as channel number, time of day, or even graphics to the user.

In the exemplary embodiment of the invention, an application programming interface (API) specifically oriented toward display element control is provided. A software agent such as an application resident on or downloaded to the CPE is provided access and control of the display element(s) via the API using, e.g., the OpenCable trusted application mechanism. The API is configured to be substantially hardware/firmware/software agnostic, thereby allowing the apparatus and methods of the invention to be utilized across multiple heterogeneous platforms within a given network, and even across different networks or types of network (e.g., in both cable television and satellite networks).

Hence, the display elements of a variety of configurations of retail STBs or other such devices can be controlled by a network operator using this "universal" API in conjunction with a trusted OCAP monitor or similar software application. This also removes significant burden from application programmers, who can now write their applications targeted to a single "universal" API.

Having such a universal API also streamlines version and update management and control procedures, since multiple different versions of an application (or other software entity, such as middleware) are now obviated.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multi-systems operator (MSO), digital networking capability, OCAP application platform and plurality of client devices/CPE, the general principles and advantages of the invention may be extended to other types of networks, architectures, and devices, whether broadband, narrowband, wired or wireless, terrestrial or satellite-based, or otherwise, the following therefore being merely exemplary in nature.

It will also be appreciated that while described generally in the context of a network providing service to a customer (i.e., home) end user domain, the present invention may be readily adapted to other types of environments including, e.g., commercial/enterprise, and government/military applications. Myriad other applications are possible.

FIG. 1 illustrates a typical network component configuration with which the display controller apparatus and methods of the present invention may be used. The various components of the network 100 include (i) one or more application origination points 102; (ii) one or more distribution servers 104; and (iii) consumer premises equipment (CPE) 106. The distribution server(s) 104 and CPE(s) 106 are connected via a bearer (e.g., HFC) network 101. A simple architecture comprising one of each of the aforementioned components 102, 104, 106 is shown in FIG. 1 for simplicity, although it will be recognized that comparable architectures with multiple origination points, distribution servers, and/or CPE devices (as well as different network topologies) may be utilized consistent with the invention. For example, the head-end architecture of FIG. 1a (described in greater detail below) may be used.

The application origination point 102 comprises any medium that allows an application to be transferred to a distribution server 104. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The distribution server 104 comprises a computer system where one or more applications can enter the network system. Distribution servers are well known in the networking arts, and accordingly not described further herein.

The CPE 106 includes any equipment in the "consumers' premises" (or other locations, whether local or remote to the distribution server 104) that can be accessed by a distribution server 104. Such CPEs 106 comprise processors and associated computer memory adapted to store and run the downloaded or resident application. In the present context of the display manager, at least a portion of the application (display software agent components) is downloaded or otherwise provided to the CPE 106, wherein the latter executes the downloaded application(s)/components. The application/agent may be (i) "pushed" to the CPE (i.e., wherein the distribution server causes the application download to occur), (ii) "pulled" to the CPE (i.e., where the CPE causes the download), (iii) downloaded as the result of some third entity or device (such as a remote server); (iv) resident on the CPE at startup; or (v) combinations of the foregoing.

Figure 1A:
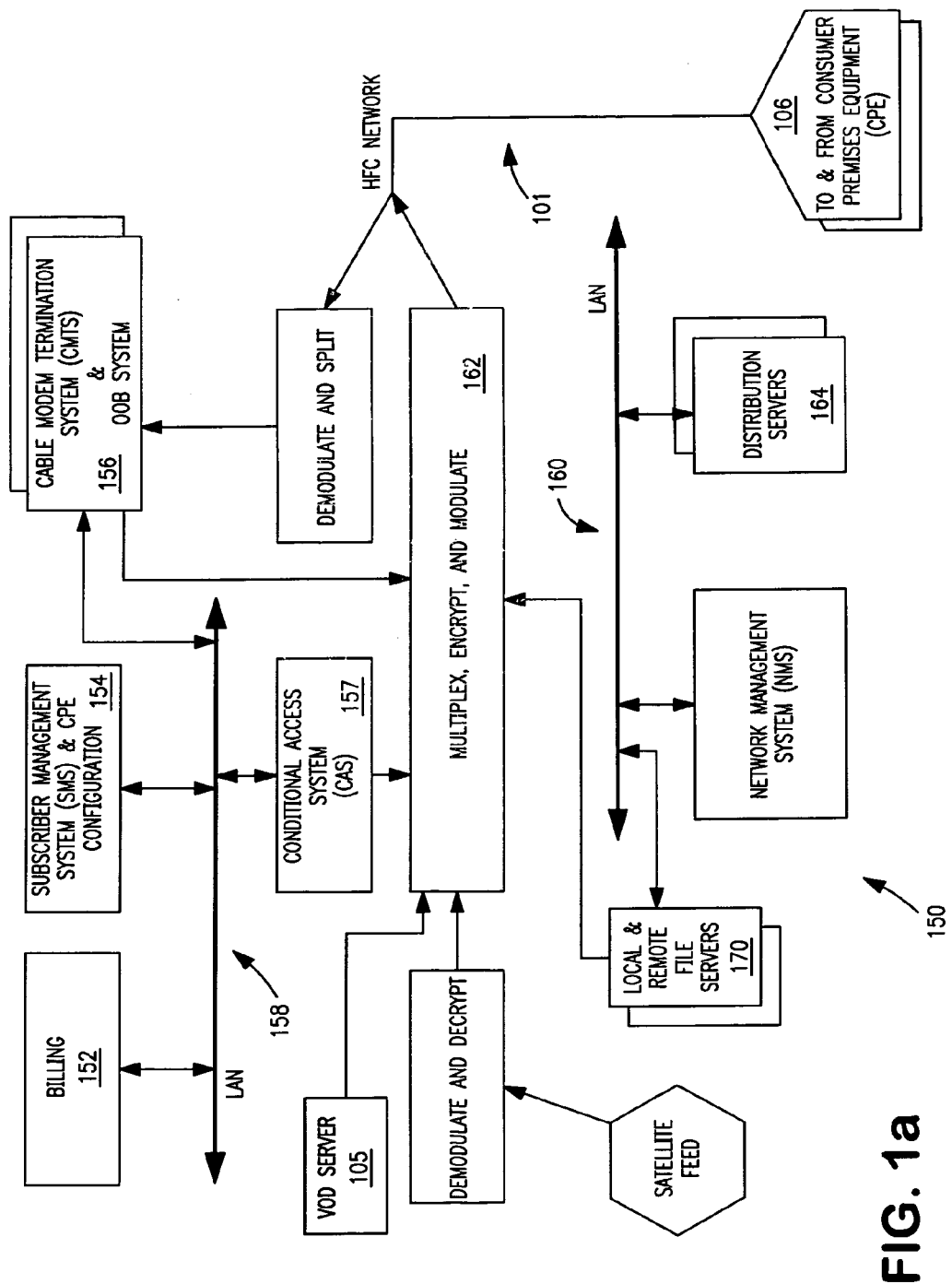
FIG. 1a is a functional block diagram illustrating one exemplary head-end configuration of the HFC network of FIG. 1.

Referring now to FIG. 1a, one exemplary embodiment of the network head-end architecture useful with the invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 and adapted to "condition" content for transmission over the network. In the present context, the distribution servers 104 are coupled to the LAN 160, which provides access to the MEM 162 and network 101 via one or more file servers 170. In the typical HFC network, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs of the type shown in FIG. 1.

Content (e.g., audio, video, etc.) or data is provided in each downstream (in-band) channel. To communicate with the head-end, the CPE 106 uses the out-of-band (OOB) DAVIC or DOCSIS channels and associated protocols. The OCAP 1.0 specification provides for networking protocols both downstream and upstream. To distribute files and applications to the CPE 106, the files and applications are configured as data and object carousels and may be sent in both the in-band and OOB channels. As is well known in the art, a carousel may be viewed as a directory containing files. The files of the carousel utilized herein are sent in a continuous round-robin fashion. If the client device misses a desired or necessary file in one carousel transmission, it can wait for the next. Alternatively, in another embodiment, the CPE portion of the application is configured as part of the program content on a given in-band, DAVIC, or DOCSIS channel. As yet another embodiment, the CPE portion is downloaded directly using IP (Internet Protocol) packet traffic in an Out-Of-Band DAVIC or DOCSIS channel. Note that the file carousel or other device providing the application to the CPE 106 via the aforementioned communication channels may be the distribution server 104 previously described, or alternatively a separate device which may or may not be physically co-located with the server (e.g., remote file servers 170 of FIG. 1a). For example, a remote file storage device (not shown) with carousel capability may be in data communication with the client device(s) via an out-of-band communications channel as described below, the download of the application files from the remote device being initiated by way of a query from the client device, or alternatively a signal generated by the server 104 and transmitted to the remote device. Many other permutations of the foregoing system components and communication methods may also be used consistent with the present invention, as will be recognized by those of ordinary skill in the field.

High speed data download (including download of files and applications such as those associated with the display controller software of the present invention) may also be provided over the network using e.g., the apparatus and methodology described in co-owned and co-pending U.S. application Ser. No. 11/013,665, filed Dec. 15, 2004 entitled "METHOD AND APPARATUS FOR HIGH BANDWIDTH DATA TRANSMISSION IN CONTENT-BASED NETWORKS", incorporated herein by reference in its entirety. In this approach, extant VOD or similar infrastructure is utilized to provide high-speed data download sessions between the VOD server and the user's CPE. It will be recognized, however, that other data transmission approaches may be used with equal success.

Methodology—

Figure 2:
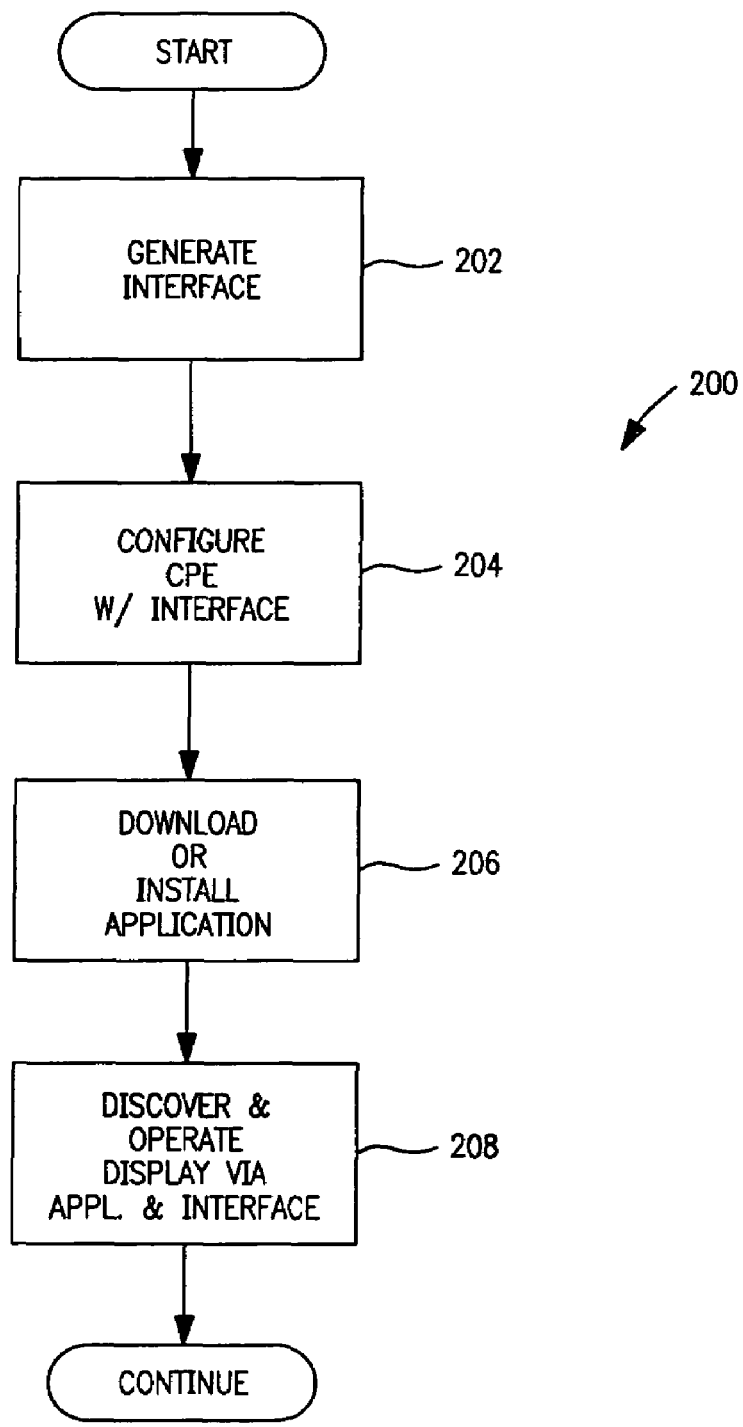
FIG. 2 is a logical flow diagram illustrating one embodiment of the generalized methodology of providing display element control according to the invention.

Referring now to FIG. 2, the generalized display discovery and control methodology of the present invention is described in detail.

In the first step 202 of the method 200, a suitable software interface (e.g., application programming interface, or API) adapted to provide access to the display discovery and control services and capabilities described subsequently herein is generated. Software interface generation methods, such as those utilizing a computerized software design environment, are well known in the art and accordingly not described further herein. It will be recognized that while the following discussion is cast in terms of traditional forms of software APIs (such as those rendered in the Sun Microsystems "Java" language), other types of interfaces may be utilized consistent with the invention to provide the desired functions, including those rendered at least partly in firmware or even hardware (such as for example where JNI access can be provided from a Java API to hardware via abstraction through a standardized Java API).

Next, per step 204, the CPE 106 or other target device is configured with the display control interface (e.g., API). The API(s) may be implemented on the CPE 106 by any number of means, including prior download and installation of software to the CPE via an in-band or OOB channel, installation via a separate media (e.g., DVD or CD-ROM) such as by the customer or a service technician, installation at the factory, and so forth. The API(s) are flexible in their implementation; i.e., they may be part of a trusted monitor or other application, part of the operating system or middleware of the CPE 106, or alternatively comprise separate or even stand-alone software modules.

Next, the desired software agent (e.g., trusted application) which will make use of the API(s) is downloaded or otherwise provided to the CPE 106 by any of the foregoing mechanisms per step 206. A trusted or privileged application, such as e.g., the monitor application defined by the OCAP 1.0 specification, is configured to register with the implementation (a.k.a. middleware) via the API to discover and receive information relating to the front panel or other display device of the CPE 106, as well as control the display device. As is well known, OCAP uses the Java-based permission scheme to provide various capabilities to applications in the network. Signed (trusted) applications are capable of receiving permissions in addition to those available to unsigned applications. In addition, an MSO or other entity can selectively assign application permissions to trusted applications of their choice. Monitor application permissions defined by OCAP give an application the ability to perform system level functions within the CPE 106, such as front panel display control.

It will be appreciated, however, that the software agent making use of the display API may comprise a non-trusted application as well if desired.

As noted above with respect to step 204, the API generated in step 202 may also be included with the trusted application when the latter is downloaded or provided to the CPE, as opposed to providing the API via a separate mechanism. Specifically, the API(s) may be delivered with the trusted CPE application, such as at time of configuration of the CPE by the network operator or at time of manufacture, or alternatively delivered subsequently to the CPE during or after setup, such as in the form of discrete software modules which are appended to or otherwise integrated with the existing target (e.g., trusted) application. Hence, the API(s) may be both included in new installations, as well as being retrofit onto older or existing CPE. This provides significant flexibility to MSOs and other such network operators, since the need to distribute new hardware (e.g., DSTBs) to their customers is obviated.

Lastly, per step 208, the API(s) is/are operated in conjunction with the accessing application (e.g., trusted monitor or otherwise) to allow the application(s) to discover, configure and operate the front panel or other display of the CPE 106. This functionality advantageously allows, inter alia, the accessing application to remotely control the display element functionality For example, the accessing application running on the CPE may comprise a client portion of a distributed application (DA), wherein the server portion (disposed at, e.g., the head-end, a distribution hub, or other network agent) communicates with the CPE client portion to change one or more display parameters. This configuration of the CPE's display parameters may occur based on information discovered at the CPE 106 and sent back to the server portion or upstream node (such as via an OOB upstream channel), or alternatively independent of any upstream communications. For example, in one variant, the trusted monitor or other privileged application which accesses the display element(s) via the API obtain information regarding the capabilities and/or present configuration of the display element(s), and transmits this information via established upstream messaging protocols to the server portion of a DA, wherein the server portion or other remote entity evaluates the information and transmits downstream (e.g., OOB or in-band) messaging to the client portion of the DA to place the CPE 106 in a desired configuration consistent with its capabilities.

Alternatively, the information extracted by the monitor application can be used by that application to configure the CPE display elements according to a predetermined scheme, advantageously without the need for any upstream or downstream messaging or signals. However, this "message-less" approach does not afford the same degree of operational flexibility to the network operator, since the monitor application must be pre-configured before download (or periodically updated via download or similar mechanism) as to the available display configurations. Using the messaging approach described above, the various display configurations available to the operator are much less restricted, and can be changed dynamically as circumstances warrant.

It is also envisaged that inputs received via the display device (e.g., via a touch-screen LCD) can be communicated back to the head-end or other remote node if required via the API and accessing application, such as via an upstream OOB signal or message.

The display discovery and control functionality may also be used as part of a setup or testing/maintenance regimen, wherein an application resident on the CPE 106 (or on a connected device, such as a dedicated maintenance or diagnostic platform) is considered "trusted" and provided access to the display elements, such as to provide the maintenance technician with front-panel status indications regarding various functions within the CPE. This is useful to identify, e.g., faults within the CPE, or to verify that it is configured properly at time of setup.

Interface Design Considerations—

It is further noted that the interface(s) provided to the CPE 106 may be generic in nature, such as for example one or more APIs having a predetermined configuration or standardization. Alternatively, all or portions of the interface(s) may be customized to the particular application or CPE (or class of CPE) to which it will be distributed. Combinations of standardized and non-standardized/customized APIs may be utilized as well in order to differentiate various services or features within the display management system.

In the illustrated embodiment, the API is made "agnostic" or generic across all CPE within the network 101 specifically so as to avoid having to generate and distribute multiple hardware-specific implementations (e.g. segmented LED, LCD, or otherwise). This agnostic interface inherently accommodates any differences between possible front panel designs which may be encountered within an MSO's network. Some exemplary differences existing in these various different display hardware configurations, as well as corresponding adaptations of the API, are now described.

Figure 3:
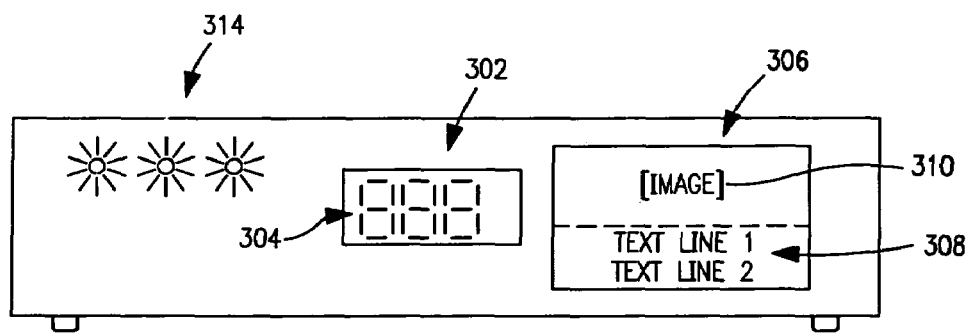
FIG. 3 is a graphical representation of an exemplary embodiment of a front panel display of a set-top box, showing LED and LCD indicators.

Typical CPE-based implementations of segmented LED displays 302 comprise one display line 304 (see FIG. 3), while LCD-based display elements 306 may have multiple lines 308 and/or images 310. Thus, the present invention advantageously supports displays having zero (0) lines (i.e., no display control functions), one (1) line, or multiple lines, thereby providing for use in literally any type of CPE.

Generally, segmented LED displays do not support the notion of a font, whereas LCDs may support multiple fonts. Thus, the API in the present invention also supports zero (0) to many fonts.

Segmented LED displays also typically support a subset of the full character set associated with a given font, while LCD displays typically support full or complete font sets. Thus, the API in the present invention is designed to be able to indicate the characters supported in the current font context.

In the typical DSTB implementation, a one-line display element will scroll in one direction (typically from right to left). However, a multi-line display both wraps and scrolls, for example from bottom to top. Thus, the API according to the present invention is designed to be able to support various types of scrolling. In addition, single line scrolling can be supported in a display capable of multiple lines by turning wrapping off. To achieve this, wrapping control is provided.

LED displays can also be addressed on an individual segment basis. This functionality allows for special effects (such as the appearance of motion of an object). This is accomplished using any number of techniques in segmented LEDs based on the number of segments. In contrast, LCDs can be addressed on a pixel-by-pixel basis. Thus, the API of the present embodiment allows for discovery of both segments and pixels. Additional information such as number of segments per segmented LED, or pixel resolution, is also optionally supported by the API.

LED displays also usually support three or four distinct colors (e.g., red, yellow, and green). In contrast, color LCDs can support literally millions of distinct colors/shades. The API of the illustrated embodiment is accordingly designed to provide color support for individually addressable items where color alteration is applicable.

Many LCDs will also support image display; e.g., display of a small JPEG or GIF file, or other format. Thus, the API of the present embodiment can also optionally be adapted to support such display of images.

The inclusion of indicators such as "power on/off" 314 (FIG. 3) is also quite common in front panel display designs. Accordingly, the exemplary embodiment of the API of the present invention is configured to support one or more indicators that can be discovered via a standardized constant, e.g. "power" status. The API also extends to one or more of the attributes of such indicator displays.

The "blinking" of LEDs or other indicators is another commonly used technique in conventional CPE front panel designs. As used herein, the term "blinking" refers to any periodic or aperiodic variation in the intensity, color, or other parameter(s) associated with a display element. A common example of such blinking comprises one or more LEDs being switched on and off at a regular or period interval, for given durations. Hence, one exemplary description of a blinking regime comprises a descriptive tuple or other construct (e.g., "on" duration, "off" duration", and frequency or period, or $\{t_{on}, t_{off}, t_{period}\}$). The API of the present invention supports blinking of visual signals on the front panel, including such attributes as blinking frequency and duration, although it will be appreciated that other parameters may be used in conjunction with or in place of the foregoing. For example, "blinking" may comprise alternating between two or more colors at a prescribed frequency/duration, or variations in the intensity of an indicator at a prescribed frequency/duration, and hence the "blinking" parameters may also include designation of a blinking color sequence in the former example, or intensity levels in the latter instance. Myriad other variations and parameters are possible, depending largely on the particular features and capabilities of the indigenous display system.

It will be recognized that the exemplary API disclosed herein also advantageously includes a "time mode" that is adaptable to both of the display types (i.e., LED and LCD). Specifically, the API is constructed such that multiple different formats or modes for displaying time information are supported, thereby obviating any specific adaptation or format translation.

It will be appreciated that while the foregoing aspects of the display discovery and control system of the invention are described in the context of LEDs and LCDs, still other types of front panel display elements (including for example thin-film transistor (TFT)-based devices, white-light LEDs, plasma displays, cathode ray tubes, etc.) may form the basis of the display elements of a CPE or other device to be controlled. Each of these alternate display devices may have its own specific parameters other than or in addition to those described above. Hence, the invention is in no way limited to the parameters or display devices described above.

Figure 4:
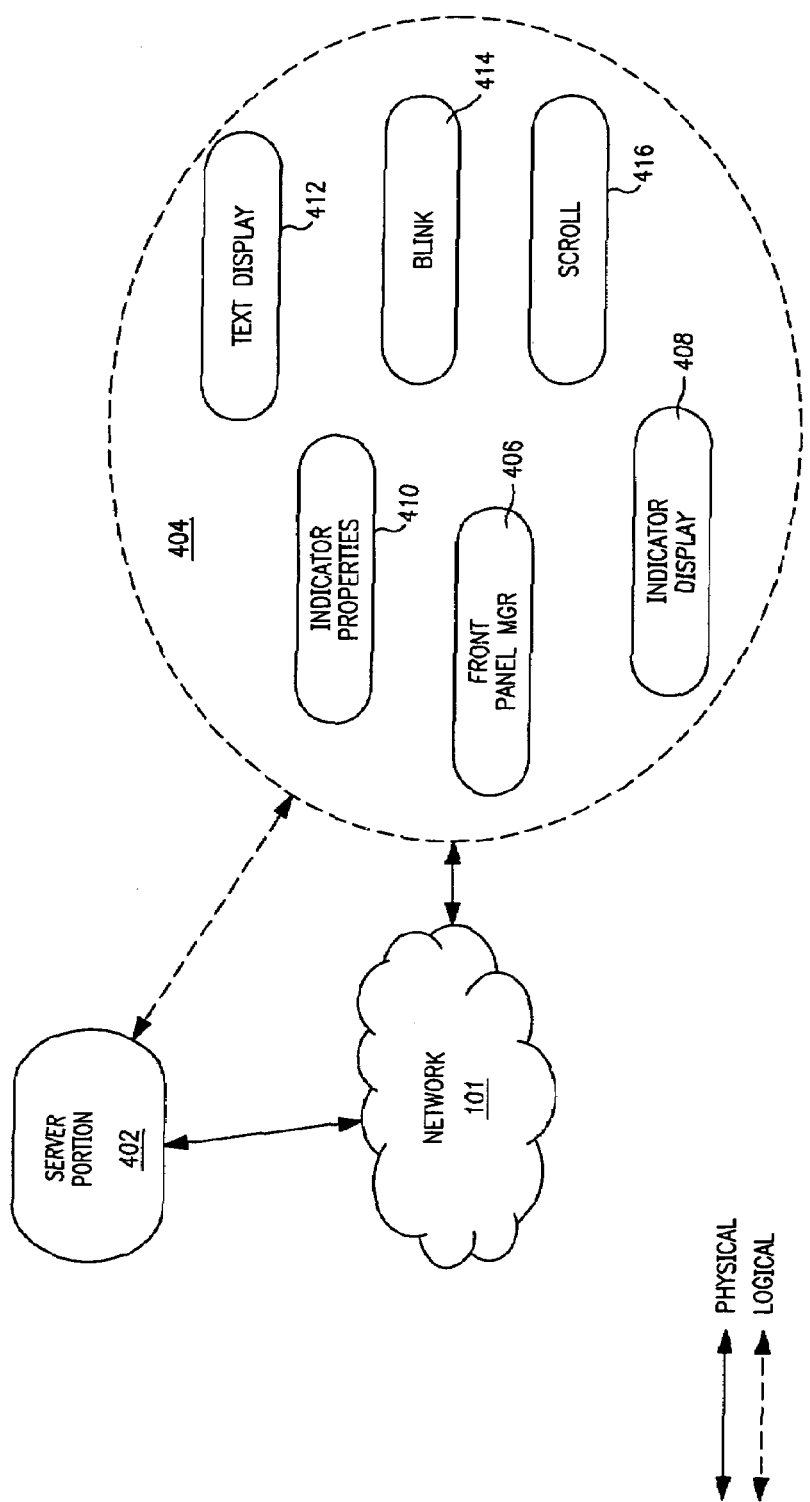
FIG. 4 is a graphical representation of an exemplary embodiment of the software architecture according to the invention.

Referring now to FIG. 4, an exemplary embodiment of the CPE software architecture 400 implementing the display control system of the invention is shown. In the illustrated embodiment, the display control system is implemented using a client-server architecture; i.e., wherein a server portion 402 of the trusted application present at a location remote from the CPE 106 (e.g., at the head end or local hub server) communicates with a client portion 404 of the application on the CPE.

The following client portion components are utilized in the illustrated embodiment of the software architecture:

Front Panel Manager—The front panel manager 406 provides a mechanism to discover the front panel hardware. It returns the indicator and text displays access APIs. This API is agnostic as to the type of hardware used in the display (e.g. segmented LED, LCD, etc.). A front panel may include a text based display with one or more rows of characters. The display may also contain individual indicators for status indication such as power. If the manager is not present in a CPE implementation, a front panel either doesn't exist or application access to the panel is not supported. Appendix I shows an exemplary Java class implementation of a Front Panel Manager in the context of an OCAP protocol suite. In addition, it allows the front panel to be reserved.

Indicator Display Interface—This interface 408 comprises a mechanism to discover the indicators available on the CPE. This interface represents the set of individual indicators on a front panel (e.g. power, recording). An individual indicator is a single lamp or icon that can be turned on or off. It may have properties such as color and brightness that can be set. In an exemplary embodiment, string constants such as "power" can be used. Various other approaches to enumerating/discovering indicators are also possible consistent with the invention. Appendix II shows an exemplary Java class implementation of Indicator Display class in the context of the OCAP protocol suite.

Indicator Properties Interface—This interface 410 represents properties of an indicator in the front panel display, including color and brightness. Appendix III illustrates an exemplary Java class implementation of an Indicator Properties class in the context of the OCAP protocol suite.

Text Display Component—This component 412 provides the mechanism to control text display. Strings can be set with supported characters with blink and/or scroll specifications added (see below). Appendix IV shows an exemplary Java class implementation of a Text Display class in the context of the OCAP protocol suite. Font control can also optionally be provided via extension of the API.

Blink Component—This component 414 provides a mechanism for setting a blink specification with text. The blink specification controls the blink-related characteristics of the display (e.g., rate, which characters blink, whether all characters blink simultaneously, etc.). Appendix V shows exemplary Java class implementation of a Blink Specification class in the context of the OCAP protocol suite.

Scroll Component—This component 416 comprises a mechanism for setting a scroll specification within the font panel text display. The scroll specification controls the direction and other related features of the text scroll function. For example, in a single line display, text will scroll from right to left. In a multi-line display, text will scroll from bottom to top. In this mode, either text lines must not exceed the length of the display, or wrap must be turned on. Appendix VI shows exemplary Java class implementation of a Scroll Specification class in the context of the aforementioned OCAP protocol suite.

CPE Architecture and Operation—

Figure 5:
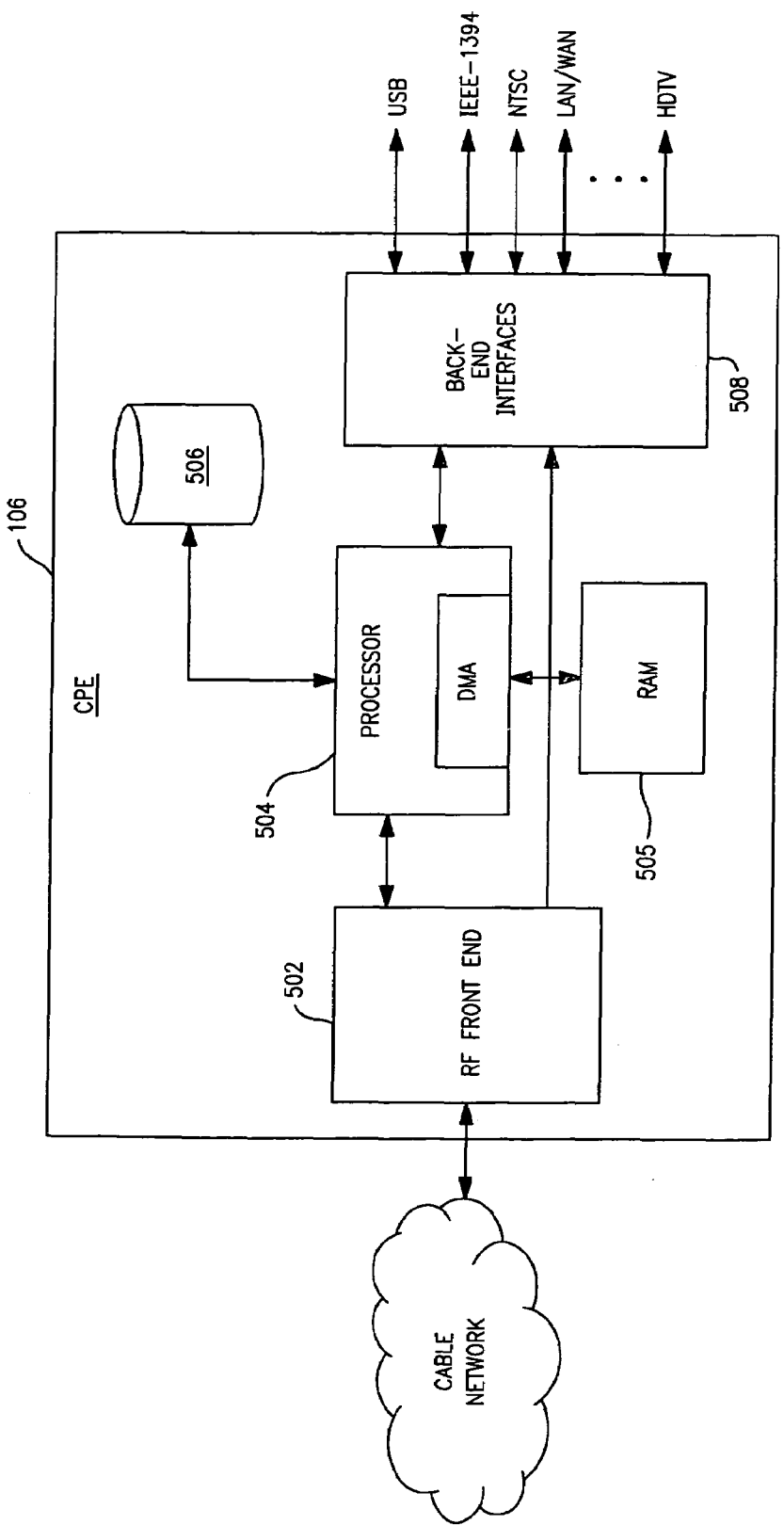
FIG. 5 is a functional block diagram of one exemplary embodiment of network CPE adapted for display element discovery and control.

FIG. 5 illustrates a first embodiment of the improved client device (e.g., CPE 106) with the display discovery and control capability according to the present invention. As shown in FIG. 5, the device 106 generally comprises and OpenCable-compliant embedded system having an RF front end 502 (including demodulator and decryption unit) for interface with the HFC network 101 of FIG. 1, digital processor(s) 504, RAM 505 and mass storage device 506, and a plurality of interfaces 508 (e.g., video/audio interfaces, IEEE-1394 "Firewire", USB, serial/parallel ports, etc.) for interface with other end-user apparatus such as televisions, personal electronics, computers, WiFi/PAN or other network hubs/routers, etc. Other components which may be utilized within the device (deleted from FIG. 5 for simplicity) include RF tuner stages, buffer memory (which may be implemented in the RAM 505 or otherwise), various processing layers (e.g., DOCSIS MAC or DAVIC OOB channel, MPEG, etc.) as well as media processors and other specialized SoC or ASIC devices. These additional components and functionality are well known to those of ordinary skill in the cable and embedded system fields, and accordingly not described further herein.

The device 106 of FIG. 5 is also provided with an OCAP-compliant monitor application and Java-based middleware which, inter alia, manages the operation of the device and applications running thereon. As described elsewhere herein, the OCAP monitor comprises a trusted application which has permissions to access various CPE components and processes, including the display elements.

It will be recognized by those of ordinary skill that myriad different device and software architectures may be used consistent with the display element manager of the invention, the device of FIG. 5 being merely exemplary. For example, the display functions or elements of the device being controlled may be disposed on a locally networked (e.g., LAN or PAN) client device that is in signal communication with the CPE 106 via a wired or wireless interface.

In another variant, the display discovery and control system of the invention is embodied within a monitor form factor; e.g., an integrated television or video monitor having "front panel" or other display elements as well as a DSTB or similar functionality (e.g., tuner stage, demultiplexer/decoder, etc.). For example, a "all in one" form factor is envisioned, wherein the monitor comprises an integrated STB functionality, and uses a combination of an LED and/or LCD front panel display along with the CRT, plasma, LCD or other main display of the monitor.

Furthermore, the hardware registry approach described in co-owned and co-pending U.S. patent application Ser. No. 10/723,959 filed Nov. 24, 2003 entitled "METHODS AND APPARATUS FOR HARDWARE REGISTRATION IN A NETWORK DEVICE", also previously incorporated herein, may be used consistent with the interface(s) of the present invention in order to facilitate display device discovery. In one exemplary variant, the API described herein can be configured to examine the hardware registry for records relating to "registered" display devices or display-related functions within the CPE 106 or other related platform.

Figure 5A:
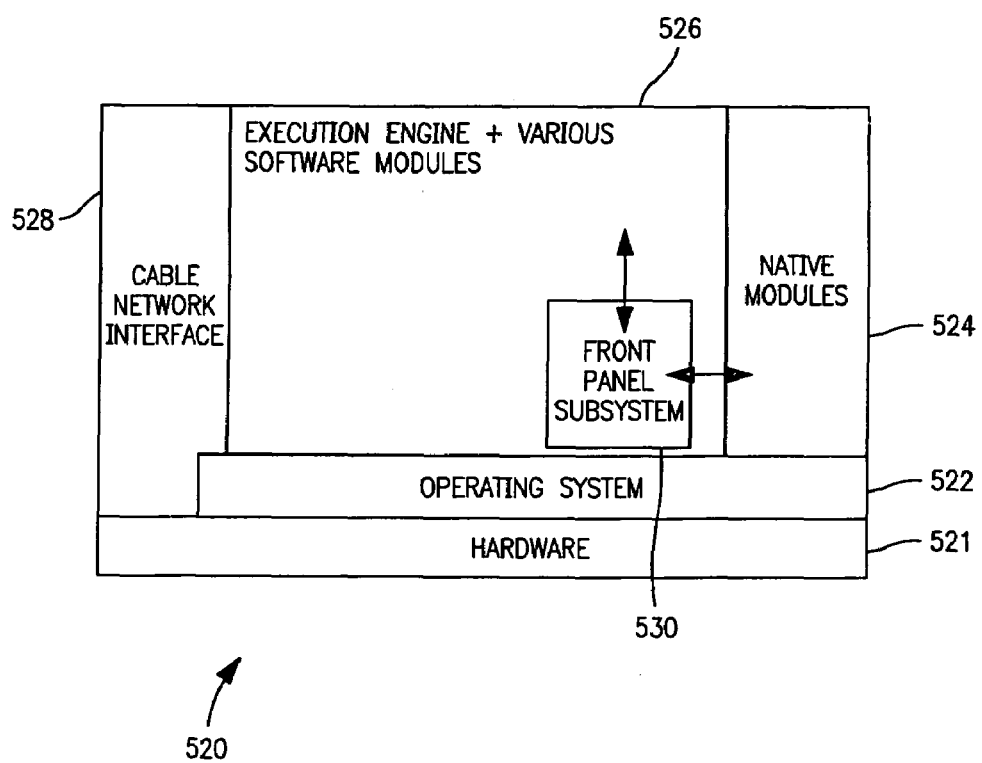
FIG. 5a is a graphical representation of a software protocol stack illustrating an exemplary implementation of the present invention within an OCAP specification framework.

FIG. 5a shows an exemplary implementation of the current invention within an OCAP-compliant cable CPE protocol stack 520. This protocol stack 520 includes a hardware module 521, operating system 522 and cable network interface functions 528, as well as native software modules 524. A software component 530 labeled "front panel subsystem" is shown within a larger functional block 526 that contains the rest of the software modules running on the CPE 106. In this embodiment, the display control interface (e.g., API) is implemented between the front panel subsystem 530 and native software modules 524. Similarly, the front panel subsystem can communicate with other software modules if desired.

The major components of the display element control system of the present invention may be implemented using various computer languages (e.g., C, C++, Java), within various middleware environments. Examples of such middlewares include, but are not limited to, OCAP, MHP, Multimedia Hypertext Experts Group (MHEG), and Digital television Application Software Environment (DASE). The following major component discussions refer to an exemplary embodiment of the Front Panel System as implemented using the Java language. It will be appreciated by those of ordinary skill that the exemplary API described below can be extended by adding support for items such as individually addressable items (i.e. graphics), text color, fonts, and graphics images. While the major component examples (Appendices I through VI) are described in the Java language as classes, other techniques using the Java (or another) language are also readily implemented, the invention being no way specific to the Java language or the following exemplary interfaces and components.

It will be appreciated that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I

Exemplary Front Panel Manager
© Copyright 2004–2005 Time Warner Cable, Inc. All rights reserved

```
org.ocap.hardware.frontpanel
Class FrontPanelManager
java.lang.Object
    |
    +--org.ocap.hardware.frontpanel.FrontPanelManager
public class FrontPanelManager
extends java.lang.Object
        This class represents an optional front panel display. A front panel may include a text
        based display with one or more rows of characters. This API is agnostic as to the type
        of hardware used in the display (e.g. segmented LED, LCD). The display may also
        contain individual indicators for status indication such as power.
```

Constructor Summary

| | |
|---|---|
| protected | FrontPanelManager ( ) <br> Protected constructor |

Method Summary

| | |
|---|---|
| IndicatorDisplay | getIndicatorDisplay ( ) <br> Gets the individual indicators display. |
| static FrontPanelManager | getInstance ( ) <br> Gets the singleton instance of the front panel manager. |
| TextDisplay | getTextDisplay( ) <br> Gets the front panel text display. |
| void | release( ) <br> Releases the front panel from a previous reservation. |
| boolean | reserve (org.davic.resources.ResourceClient resourceClient) <br> Reserves the front panel for exclusive use by an application. |

Methods inherited from class java.lang.Object clone, equals, finalize, getClass, hashCode, notify, notifyAll, toString, wait, wait, wait Constructor Detail

```
FrontPanelManager
protected FrontPanelManager ( )
        Protected constructor. Cannot be used by an application.
```

Method Detail

```
getInstance
public static ProntPanelManager getInstance( )
        Gets the singleton instance of the front panel manager. The singleton MAY be
        implemented using application or implementation scope.
        Returns:
        The front panel manager.
reserve
public boolean reserve(org.davic.resources.ResourceClient resourceClient)
        Reserves the front panel for exclusive use by an application. The implementation
        SHALL give front panel reservation to the highest priority application making a
```

APPENDIX I-continued

Exemplary Front Panel Manager
© Copyright 2004–2005 Time Warner Cable, Inc. All rights reserved reservation request.
Parameters:
resourceClient—A client the implementation will notify when it is necessary to take away the front panel resource.
Returns:
True if the implementation accepted the reservation request, otherwise returns false.

release
public void release( )
    Releases the front panel from a previous reservation. If the calling application is not the application that reserved the front panel, or if the front panel is not reserved when this method is called, this method does nothing.

getTextDisplay
public TextDisplay getTextDisplay ( )
    Gets the front panel text display.
    Returns:
    Front panel text display, or null if such a display is not supported.

getIndicatorDisplay
public IndicatorDisplay getIndicatorDisplay( )
    Gets the individual indicators display.
    Returns:
    Set of individual indicators, or null if no individual indicators are supported.

APPENDIX II

Exemplary Indicator Display
© Copyright 2004–2005 Time Warner Cable, Inc. All rights reserved
Interface IndicatorDisplay public interface IndicatorDisplay
This interface represents the set of individual indicators on a front panel (e.g. power, recording). An individual indicator is a single lamp or icon that can be turned on or off. It may have properties such as color and brightness that can be set.

Field Summary

| | |
|---|---|
| static java.lang.String | MESSAGE<br>Message LED |
| static java.lang.String | POWER<br>Power LED |
| static java.lang.String | RECORD<br>Record LED |
| static java.lang.String | RFBYPASS<br>RF bypass LED |

Method Summary

| | |
|---|---|
| java.util.Hashtable | getIndicators( )<br>Gets the set of available indicators. |

Field Detail

POWER
public static final java.lang.String POWER
    Power LED

RFBYPASS
public static final java.lang.String RFBYPASS
    RF bypass LED

MESSAGE
public static final java.lang.String MESSAGE
    Message LED

RECORD
public static final java.lang.String RECORD
    Record LED

Method Detail getIndicators
public java.util.Hashtable getIndicators( )
    Gets the set of available indicators. The HashTable returned SHALL contain the name of the indicator and a corresponding IndicatorProperties object. The set of standardized indicators includes "power", "rfbypass", "message", and "record". The IndicatorProperties associated with each indicator can be used to change the color and brightness (i.e. turn on or off) if those properties are supported.
    Returns:
    The set of supported indicators. MAY return indicators not included in the standardized set.

APPENDIX III

Exemplary Indicator Properties
© Copyright 2004–2005 Time Warner Cable, Inc. All rights reserved
Interface IndicatorProperties public interface IndicatorProperties
This interface represents properties of an indicator in the front panel display, including color and brightness.

Field Summary

| | | |
|---|---|---|
| static byte | BLUE | |
| | Indicator color blue. | |
| static byte | COLOR_NOT_SUPPORTED | |
| | Indicator color not supported. | |
| static byte | GREEN | |
| | Indicator color green. | |
| static byte | OFF | |
| | Minimum brightness setting. | |
| static byte | ORANGE | |
| | Indicator color orange. | |
| static byte | RED | |
| | Indicator color red. | |
| static byte | YELLOW | |
| | Indicator color yellow. | |

Method Summary

| | | |
|---|---|---|
| int | getBrightness( ) | |
| | Gets the brightness of the Indicator. | |
| int | getBrightnessLevels( ) | |
| | Gets the number of brightness levels supported. | |
| byte | getColor( ) | |
| | Gets the current color of the inciator. | |
| byte | getSupportedColors( ) | |
| | Gets the supported colors. | |
| void | setBrightness(byte brightness) | |
| | Sets the brightness of the indicator. | |
| void | setColor(byte color) | |
| | Sets the color of all segments in all front panel LEDs. | |

Field Detail

OFF
public static final byte OFF
   Minimum brightness setting.
COLOR_NOT_SUPPORTED
public static final byte COLOR_NOT_SUPPORTED
   Indicator color not supported.
BLUE
public static final byte BLUE
   Indicator color blue.
GREEN
public static final byte GREEN
   Indicator color green.
RED
public static final byte RED
   Indicator color red.
YELLOW
public static final byte YELLOW
   Indicator color yellow.
ORANGE
public static final byte ORANGE
   Indicator color orange.

Method Detail getColor
public byte getColor( )
   Gets the current color of the inciator. See definitions of COLOR NOT SUPPORTED, BLUE,
   GREEN, RED, YELLOW, and ORANGE for possible values.
   Returns:
   Indicator color.
getSupportedColors
public byte getSupportedColors( )
   Gets the supported colors. The value returned SHALL contain values for the possible
   color set OR'ed together. See definitions of COLOR NOT SUPPORTED, BLUE, GREEN, RED,
   YELLOW, and ORANGE for possible values.
   Returns:
   Supported color set.
setColor
public void setColor(byte color)
   Sets the color of all segments in all front panel LEDs.
   Parameters:

APPENDIX III-continued

Exemplary Indicator Properties
© Copyright 2004–2005 Time Warner Cable, Inc. All rights reserved
Interface IndicatorProperties color—Indicator color.
   Throws:
   java.lang.IllegalArgumentException—if the value of the color parameter is not
   in the supported color set.
   UnsupportedOperationException—if color is not supported.
getBrightness
public int getBrightness( )
   Gets the brightness of the Indicator. Possible return values include OFF and any
   brightness levels above that up to the value returned by getBrightnessLevels( ) + 1.
   Returns:
   LED brightness.
getBrightnessLevels
public int getBrightnessLevels( )
   Gets the number of brightness levels supported. The minimum support SHALL be OFF + 1.
   This provides an on/off capability.
   Returns:
   Indicator brightness levels.
setBrightness
public void setBrightness(byte brightness)
   Sets the brightness of the indicator. Setting the brightness level to OFF turns the
   indicator off.
   Parameters:
   brightness—Indicator brightness.
   Throws:
   java.lang.IllegalArgumentException—if the brightness value is not one of OFF to
   the value returned by getBrightnessLevels( ) + 1.

APPENDIX IV

Exemplary Text Display
© Copyright 2004–2005 Time Warner Cable, Inc. All rights reserved
Interface TextDisplay public interface TextDisplay
   This interface represents one line of characters in a front panel display.

Field Summary

| | | |
|---|---|---|
| static byte | STRING MODE | |
| | The line can be set using a string of displayable characters. | |
| static byte | TWELVE HOUR CLOCK | |
| | This line will display the network time using a standard 12 hour HH:MM format. | |
| static byte | TWENTYFOUR HOUR CLOCK | |
| | This line will display the network time using a military 24 hour HH:MM format. | |

Method Summary

| | | |
|---|---|---|
| void | eraseDisplay( ) | |
| | Removes characters from the text display. | |
| BlinkSpec | getBlinkSpec( ) | |
| | Gets the blink specification for the front panel text display. | |
| java.lang.String | getCharacterSet( ) | |
| | Gets the set of characters supported by the display. | |
| int | getMode( ) | |
| | Gets the text display mode. | |
| int | getNumberColumns( ) | |
| | Gets the number of columns (characters) per line in the text display. | |
| int | getNumberRows( ) | |
| | Gets the number of rows (i.e. | |
| ScrollSpec | getScrollSpec( ) | |
| | Gets the scroll specification for the front panel text display. | |
| void | setClockDisplay(byte mode, BlinkSpec blinkSpec, ScrollSpec scrollSpec) | |
| | Displays the current system time on the front panel text display. | |
| void | setTextDisplay(java.lang.Strinq[ ] text, BlinkSpec blinkSpec, ScrollSpec scrollSpec) | |
| | Displays text on the front panel display. | |
| void | setWrap(boolean wrap) | |
| | Sets wrapping on or off. | |

APPENDIX IV-continued

Exemplary Text Display
© Copyright 2004–2005 Time Warner Cable, Inc. All rights reserved
Interface TextDisplay Field Detail TWELVE_HOUR_CLOCK
public static final byte TWELVE_HOUR_CLOCK
   This line will display the network time using a standard 12 hour HH:MM format.
TWENTYFOUR_HOUR_CLOCK
public static final byte TWENTYFOUR_HOUR_CLOCK
   This line will display the network time using a military 24 hour HH:MM format.
STRING_MODE
public static final byte STRING_MODE
   The line can be set using a string of displayable characters.

Method Detail getScrollSpec
public ScrollSpec getScrollSpec( )
   Gets the scroll specification for the front panel text display. Changing values within
   the object returned by this method does not take affect until one of the set display
   methods in this interface is called and the object is passed to the implementation.
   Returns:
   LED front panel scroll specification.
getBlinkSpec
public BlinkSpec getBlinkSpec( )
   Gets the blink specification for the front panel text display. Changing values within the
   object returned by this method does not take affect until one of the set display methods
   in this interface is called and the object is passed to the implementation.
   Returns:
   LED front panel scroll specification.
getMode
public int getMode( )
   Gets the text display mode. See definitions of TWELVE HOUR CLOCK,
   TWENTYFOUR HOUR CLOCK, and STRING MODE for possible return values.
   Returns:
   Text display mode.
getNumberColumns
public int getNumberColumns( )
   Gets the number of columns (characters) per line in the text display. The text is
   considered fixed font by this method. Dynamic font sizes can be supported and the
   calculation for this method uses the largest character size for the given font.
   Returns:
   Number of columns.
getNumberRows
public int getNumberRows( )
   Gets the number of rows (i.e. lines) in the text display.
   Returns:
   Number of rows.
getCharacterSet
public java.lang.String getCharacterSet( )
   Gets the set of characters supported by the display. This API does not contain font
   support and this method is the only way to discover the character set supported by the
   front panel. In addition, certain types of displays do not support the entire alphabet or
   symbol set, e.g. seven segment LEDs.
   Returns:
   Supported character set.
setClockDisplay
public void setClockDisplay(byte mode,
                   BlinkSpec blinkSpec,
                   ScrollSpec scrollSpec)
   Displays the current system time on the front panel text display. The display is
   formatted to the mode parameter.
   Parameters:
   mode—One of the clock modes; TWELVE HOUR CLOCK, or TWENTYFOUR HOUR CLOCK.
   properties—Properties for the clock display.
   blinkSpec—Blink specification if blinking is desired. A value of null turns blinking
   off.
   scrollSpec—Scroll specification if scrolling is desired. A value of null turns scrolling
   off. If there is only one line of text scrolling will be from right to left. If there is more
   than one line of text scrolling will be from bottom to top. Passing in null turns
   scrolling off.
   Throws:
   java.lang.IllegalArgumentException—if the mode parameter is not one of
   TWELVE HOUR CLOCK, TWENTYFOUR HOUR CLOCK.
setTextDisplay
public void setTextDisplay(java.lang.String[ ] text,
                   BlinkSpec blinkSpec,
                   ScrollSpec scrollSpec)

APPENDIX IV-continued

Exemplary Text Display
© Copyright 2004–2005 Time Warner Cable, Inc. All rights reserved
Interface TextDisplay Displays text on the front panel display. If multiple fonts are possible the
implementation SHALL determine which will be used. Sets the LED front panel to the
text mode; see STRING MODE. The text parameter will be used to display text
characters in the display. Wrapping occurs if there is more than one line, wrapping is
turned on, and the text over-fills at least one line.
Parameters:
text—String of characters to display. Each string in the array represents a line of text.
text[0] represents the top line, text[1] represents the next line down, and so forth.
blinkSpec—Blink specification if blinking is desired. Passing in null turns blinking
off.
scrollSpec—Scroll specification if scrolling is desired. If there is only one line of
text scrolling will be from right to left. If there is more than one line of text scrolling
will be from bottom to top. Passing in null turns scrolling off.
Throws:
java.lang.IllegalArgumentException—if the text array contains more than 1 line
and one or more lines are longer than the display and wrap is turned off.
setWrap
public void setWrap(boolean wrap)
  Sets wrapping on or off.
  Parameters:
  wrap—If wrap is true wrapping is turned on, otherwise wrapping is turned off.
eraseDisplay
public void eraseDisplay( )
  Removes characters from the text display.

APPENDIX V

Exemplary Blink Specification
© Copyright 2004–2005 Time Warner Cable, Inc. All rights reserved.
Interface BlinkSpec public interface BlinkSpec
  This interface represents the front panel text display blinking specification. All
  characters blink at the same time.

Method Summary

| | | |
|---|---|---|
| int | getIterations( ) | |
| | Gets the number of times per minute the text display will blink. | |
| int | getMaxCycleRate( ) | |
| | Gets the maximum number of times per minute all segments in an LED can blink. | |
| int | getOnDuration( ) | |
| | Gets the percentage of time the text will be on during one blink iteration. | |
| void | setIterations(int iterations) | |
| | Sets the number of times per minute data will blink across all of the LEDs. | |
| void | setOnDuration(int duration) | |
| | Sets the percentage of time the text display will remain on during one blink iteration. | |

Method Detail getIterations
public int getIterations( )
  Gets the number of times per minute the text display will blink.
  Returns:
  Number of blink iterations per minute.
getMaxCycleRate
public int getMaxCycleRate( )
  Gets the maximum number of times per minute all segments in an LED can blink.
  Returns:
  Maximum number of blink iterations per minute.
setIterations
public void setIterations(int iterations)
  Sets the number of times per minute data will blink across all of the LEDs.
  Parameters:
  iterations—Number of blink iterations per minute.
  Throws:
  java.lang.IllegalArgumentException—if the iteration is negative or cannot be
  supported by the front panel.
getOnDuration
public int getOnDuration( )
  Gets the percentage of time the text will be on during one blink iteration.
  Returns:
  Text display blink on percentage duration.

APPENDIX V-continued

Exemplary Blink Specification
© Copyright 2004–2005 Time Warner Cable, Inc. All rights reserved.
Interface BlinkSpec

--- setOnDuration
public void setOnDuration(int duration)
   Sets the percentage of time the text display will remain on during one blink iteration.
   Parameters:
   duration—Text display blink on percentage duration. Setting this value to 100 sets
   the display no solid, no blinking. Setting this value to 0 effectively turns off the front
   panel display. Subtracting this value from 100 yields the percentage of off time during
   one blink iteration.
   Throws:
   java.lang.IllegalArgumentException—if the duration is negative or exceeds 100.

APPENDIX VI

Exemplary Scroll Specification
© Copyright 2004–2005 Time Warner Cable, Inc. All rights reserved
Interface ScrollSpec

--- public interface ScrollSpec
   This interface represents the scrolling specification of a front panel text display. In a
   single line display text will scroll from right to left. In a multi-line display text will
   scroll from bottom to top. In this mode either text lines must not exceed the length of
   the display or wrap must be turned on.

Method Summary

| | |
|---|---|
| int | getHoldDuration( ) |
| | Gets the percentage of time the scroll will hold at each character during one scroll iteration. |
| int | getHorizontalIterations( ) |
| | Gets the number of times per minute the characters are set to scroll across the screen from right to left. |
| int | getMaxHorizontalIterations( ) |
| | Gets the maximum number of times per minute characters can scroll right to left across the display with zero hold time set. |
| int | getMaxVerticalIterations( ) |
| | Gets the maximum number of times per minute characters can scroll bottom to top across the display with zero hold time set. |
| int | getVerticalIterations( ) |
| | Gets the number of times per minute the characters are set to scroll across the screen from bottom to top. |
| void | setHoldDuration(int duration) |
| | Sets the percentage of time to hold at each character before scrolling it to the next position during one scroll iteration. |
| void | setHorizontalIterations(int iterations) |
| | Sets the number of times per minute one character will scroll across the display from right to left. |
| void | setVerticalIterations(int iterations) |
| | Sets the number of times per minute one character will scroll across the display from bottom to top. |

Method Detail getMaxHorizontalIterations
public int getMaxHorizontalIterations( )
   Gets the maximum number of times per minute characters can scroll right to left
   across the display with zero hold time set.
   Returns:
   Number of horizontal scroll iterations per minute.
getMaxVerticalIterations
public int getMaxVerticalIterations( )
   Gets the maximum number of times per minute characters can scroll bottom to top
   across the display with zero hold time set.
   Returns:
   Number of vertical scroll iterations per minute. Returns −1 if the display only supports
   one row.
getHorizontalIterations
public int getHorizontalIterations( )
   Gets the number of times per minute the characters are set to scroll across the screen
   from right to left.
   Returns:
   Number of horizontal scroll iterations per minute. A value of 0 indicates horizontal
   scrolling is turned off. A value of −1 indicates there is more than one row displayed
   and characters will scroll vertically.

APPENDIX VI-continued

Exemplary Scroll Specification
© Copyright 2004–2005 Time Warner Cable, Inc. All rights reserved
Interface ScrollSpec

```
getVerticalIterations
public int getVerticalIterations( )
    Gets the number of times per minute the characters are set to scroll across the screen
    from bottom to top.
    Returns:
    Number of vertical scroll iterations per minute. A value of 0 indicates vertical
    scrolling is turned off. A value of −1 indicates there is only one row of characters
    displayed and characters will scroll horizontally.
setHorizontalIterations
public void setHorizontalIterations(int iterations)
    Sets the number of times per minute one character will scroll across the display from
    right to left.
    Parameters:
    iterations—Number of horizontal scroll iterations per minute.
    Throws:
    java.lang.IllegalArgumentException—if the iteration is negative or exceed the
    value returned by getMaxHorizontalIterations.
setVerticalIterations
public void setVerticalIterations(int iterations)
    Sets the number of times per minute one character will scroll across the display from
    bottom to top.
    Parameters:
    iterations—Number of vertical scroll iterations per minute.
    Throws:
    java.lang.IllegalArgumentException—if the iteration is negative or exceed the
    value returned by getMaxVerticalalIterations.
getHoldDuration
public int getHoldDuration( )
    Gets the percentage of time the scroll will hold at each character during one scroll
    iteration.
    Returns:
    Character hold duration.
setHoldDuration
public void setHoldDuration(int duration)
    Sets the percentage of time to hold at each character before scrolling it to the next
    position during one scroll iteration.
    Parameters:
    duration—Character hold percentage duration. Setting this value causes a smooth
    scroll across all characters without a hold on any of them.
    Throws:
    java.lang.IllegalArgumentException—if duration is negative or if the duration
    percentage is greater than 100 divided by the number of characters to scroll across
    during horizontal scroll, or the number of rows to scroll across during vertical scroll.
```

What is claimed is:

1. A computer readable apparatus for use in a content distribution network, said apparatus comprising a computer readable media to store a computer program which is executed to display an output by utilizing:

a manager entity to discover at least one display element of said computerized device, and to return at least one of an indicator display application programming interface (API) or a text display API, said at least one API for use across multiple heterogeneous platforms;

an indicator display interface to discover at least one indicator of said at least one display element;

an indicator properties interface to discover at least one property of said at least one indicator;

a text display component to control the display of text on said at least one display element;

a blink component to set a blink specification of at least a portion of said at least one display; and a scroll component to set a scroll specification of at least a portion of said at least one display.

2. Consumer premises equipment (CPE) for use in a content-based network, said equipment comprising:

at least one diode- or liquid crystal-based display element operative to display status or other information relating to the operation of said CPE;

an application programming interface (API) resident on said CPE, said API to provide access to said at least one display element; and a trusted monitor application running at least in part on said CPE, said trusted monitor application to:

obtain data regarding said at least one display element of said CPE via said API; and transmit said data to an upstream server of said content-based network;

wherein said trusted monitor application controls said at least one display element via said API based at least in part on messages received from said upstream server in response to said data transmitted thereto; and wherein said API interfaces with a plurality of different configurations of said display element.

3. The CPE of claim 2, wherein said data regarding said at least one display element of said CPE comprises information regarding at least one of capabilities or present configuration of said at least one display element.

4. The CPE of claim 3, wherein said at least one display element comprises a liquid crystal display device having the ability to display graphical images according to at least one file format selected from the group consisting of: (i) GIF; (ii) TIFF; and (iii) JPEG.

5. The apparatus of claim 1, wherein said API comprises a substantially platform-agnostic application programming interface rendered in Java programming language.

6. The apparatus of claim 1, wherein said software architecture comprises a privileged application.

7. The apparatus of claim 6, wherein said privileged application is accessible to a privileged entity of said network remote to said computerized device.

8. The apparatus of claim 6, wherein said privileged application comprises a trusted monitor application.

9. For use in a cable television network, consumer premises equipment (CPE) comprising:
   a first component to:
      discover at least one display element associated with said CPE, said at least one display element comprising at least one of (i) a plurality of light-emitting diode (LED) segments, and (ii) a liquid crystal display (LCD); and
      return at least one of an indicator display API or a text display API, said at least one API for use across multiple heterogeneous platforms;
   a second component to discover at least one indicator of said display element, and provide information regarding at least one property of said at least one indicator;
   a third component to control display of said text; and
   a fourth component to control one or more aspects of blinking or scrolling of said at least one display.

10. The CPE of claim 9, wherein said API comprises a substantially platform-agnostic application programming interface rendered in a Java programming language.

11. The CPE of claim 8, wherein at least a portion of said first, second, third and fourth components are provided to said CPE via at least one of:
   download and installation via an in-band or OOB channel; or
   installation via a separate removable media.

12. The CPE of claim 9, wherein said CPE communicates with at least one remote entity of said content distribution network, said at least one remote entity directing said control of said display of text, and said one or more aspects of said blinking and scrolling.

13. The CPE of claim 12, wherein said at least one remote entity comprises a head-end server.

14. The CPE of claim 9, wherein said first, second, third and fourth components each comprise software processes.

15. The CPE of claim 9, wherein said CPE comprises a digital set-top box (DSTB).

16. Consumer premises equipment (CPE) for use in a content-based network, said CPE comprising:
   at least one diode- or liquid crystal-based display element operative to display information relating to the operation of said CPE;
   an application programming interface (API) resident on said CPE, said API to provide access to said at least one display element; and
   a privileged application running at least in part on said CPE and having permission to utilize said API, said privileged application to:
      obtain information regarding said at least one display element of said CPE via said API; and
      transmit said information to a server of said content-based network;
   wherein said privileged application is used by said server to control said at least one display element via said API; and
   wherein said API interfaces with a plurality of different configurations of said display element.

17. The CPE of claim 16, wherein said control of said at least one display element by said server is based at least in part on messages received from said upstream server at said CPE in response to information transmitted thereto from said CPE.

18. The CPE of claim 16, wherein said privileged application comprises a trusted monitor application.

19. The CPE of claim 16, wherein said CPE is OpenCable compliant and is used in a cable television network, and said privileged application comprises an OCAP-compliant monitor application.

20. The CPE of claim 16, wherein said CPE comprises a satellite receiver, and said network comprises a satellite television network.

21. The CPE of claim 16, wherein said at least one display element comprises a liquid crystal display device having the ability to display graphical images according to at least one file format selected from the group consisting of: (i) GIF; (ii) TIFF; and (iii) JPEG.

22. The CPE of claim 16, wherein said information regarding said at least one display element of said CPE comprises information regarding at least one of (i) capabilities, or (ii) present configuration, of said at least one display element.

* * * * *